United States Patent [19]

Tanimura

[11] 4,149,141
[45] Apr. 10, 1979

[54] VEHICLE LIGHT ASSEMBLY

[76] Inventor: Kiyotaka Tanimura, 5-2 Hama-cho 1-chome, Odawara, Kanagawa, Japan

[21] Appl. No.: 825,456

[22] Filed: Aug. 17, 1977

Related U.S. Application Data

[63] Continuation-in-part of Ser. No. 717,558, Aug. 26, 1976, Pat. No. 4,059,824.

[51] Int. Cl.² .............................................. B60Q 1/26
[52] U.S. Cl. ........................................ 340/66; 340/71; 340/94
[58] Field of Search ........................ 340/66, 71, 87, 89, 340/94, 133

[56] References Cited
U.S. PATENT DOCUMENTS

| 3,434,107 | 3/1969 | Pfund | 340/97 |
| 3,676,844 | 7/1972 | Hendrickson | 340/71 |
| 4,059,824 | 11/1977 | Tanimura | 340/71 |

Primary Examiner—Donald J. Yusko
Attorney, Agent, or Firm—Wenderoth, Lind & Ponack

[57] ABSTRACT

A vehicle light assembly for indicating operating conditions of the vehicle to drivers of trailing vehicles, and comprising a rotatable lamp housing having green and amber lamps on one side thereof and a red lamp on another side thereof, a position switch associated with the accelerator pedal of the vehicle to light the green lamps when the accelerator pedal is depressed, a pressure switch for extinguishing the green lamps and lighting the amber lamps upon a decrease of the intake pressure of the engine below a predetermined level, and a switch extinguishing the green and amber lamps and lighting the red lamp and energizing a rotating mechanism when braking system of the vehicle is applied.

2 Claims, 5 Drawing Figures

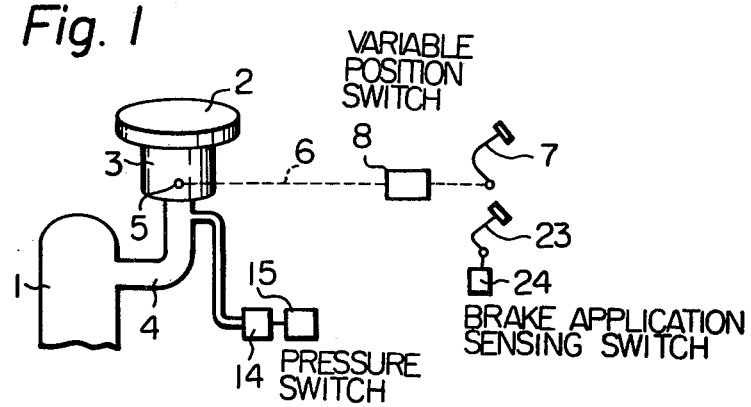
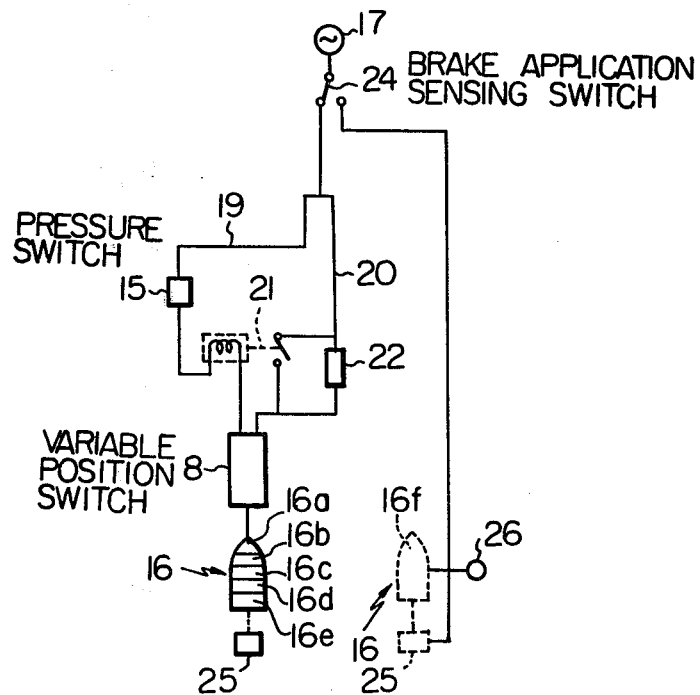

VEHICLE LIGHT ASSEMBLY

This invention relates to automotive warning lights, and is a continuation in part application relating to my co-pending application No. 717,558, filed on Aug. 26, 1976 now U.S. Pat. No. 4,059,824.

BACKGROUND OF THE INVENTION

Traffic laws and regulations dictate that various lamps or lights be provided in an automobile for warning or notifying drivers in other cars or pedestrians of the condition of the automobile. For prevention of rear-end collisions it is preferable that the drivers of trailing cars be properly notified of the condition of a preceding car so as to apply a suitable braking operation. At the present time, there is provided only a stop light or lights for warning drivers of trailing cars of a braking action. Thus, there is not any means for warning or notifying the drivers of trailing cars of various operating conditions including accelerating operations and engine braking operations of a preceding car.

SUMMARY OF THE INVENTION

It is accordingly an object of the present invention to provide automotive lights or lamps for warning drivers of trailing cars of operating conditions including engine braking.

It is another object of the present invention to provide automotive lights or lamps for indicating to drivers of trailing cars the occurrence of an accelerating operation of a preceding vehicle by a plurality of green lights or lamps and of decelerating or engine braking operations of the preceding vehicle by a plurality of amber lights or lamps.

Preferably, the green lights and the amber lights are mounted in a housing to constitute a lamp assembly, and the lamp assembly is rotatably mounted on the vehicle such that the lamp assembly is rotated to act as a stop light when the brake pedal or the hand brake lever is applied.

BRIEF DESCRIPTION OF THE DRAWINGS

These and other objects and features of the present invention will be clarified from a reading of the following part of the specification in conjunction with the accompanying drawings which indicate a preferred embodiment of the present invention, and in which:

FIG. 1 is a schematic view showing the arrangement of electric switches according to the present invention;

FIG. 2 is a schematic diagram of an electric circuit;

DETAILED DESCRIPTION OF THE INVENTION

Figure 3:
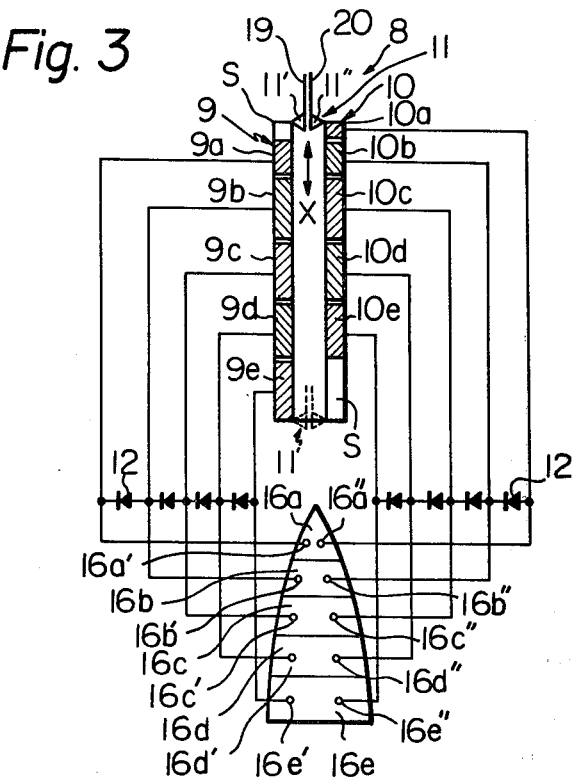
FIG. 3 is a detailed view of a portion of the electric circuit of FIG. 2.

Referring to FIG. 1, intake air is introduced through an air cleaner 2, a carburetor 3, and an intake pipe 4 into a cylinder 1 of an engine of an automobile. A shaft 5 of a throttle valve (not shown) of the carburetor 3 is coupled through a transmission 6 such as a cable or a rod to an accelerator pedal 7 for the purpose of controlling the engine by adjusting the throttle valve in the carburetor 3. According to the present invention a sensor 8 is provided to detect the position of the accelerator pedal being depressed or the opening of the throttle valve. The sensor 8 is shown to detect the movement or the linear position of the transmission 6 in the illustrated embodiment, but it may be arranged to detect the angular movement of the accelerator pedal shaft or the shaft 5 of the throttle valve.

A sensor 14 detecting pressure in the intake pipe 4 is coupled at a position downstream of the throttle valve of the carburetor 3 and actuates a pressure switch 15 at a predetermined pressure level, for instance, at a pressure level of 0.2 Kg/cm$^2$ absolute. The sensor 14 may be of any suitable type such as, a spring loaded diaphragm or piston type or the like, or of a known type utilizing a pressure gauge mechanism.

Shown at 24 is an electric switch for energizing one or more stop lights and, in the drawing, the switch 24 is associated with a brake pedal 23 and a hand brake lever (not shown). Stop light actuating systems are well known to the public and thus further description will be omitted.

Figure 4:
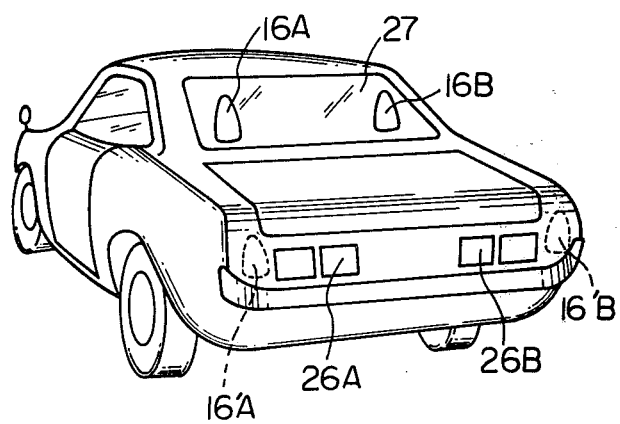
FIG. 4 is a perspective rear view of an automobile having the warning lights of the present invention.

In FIG. 2 showing the outline of an electric circuit according to the present invention, an electric power source 17 such as a battery or a generator of the automobile actuates a lamp assembly 16 and a stop light 26. Preferably two or more lamp assemblies 16A, 16B or 16'A, 16'B are provided on right and left sides of the rear end of an automobile or on the inside or rear window 27 as shown in FIG. 4, and two or more stop lights 26A, 26B are provided according to the usual technique, but for the sake of simplicity only one is shown in FIG. 2.

The switch 24 supplies electric power to lines 19 and 20 when the brake pedal or the hand brake lever is not actuated, and lamp assemblies 16a – 16e consisting of green and amber lights are actuated according to the manner which will be described in detail hereinafter.

The lamp assemblies 16a – 16e consist of five portions which are adapted to light selectively green or amber lights. To this end, green and amber lamps may be provided in respective portions, or alternately, there may be used a combination of yellow or bright yellow glass and blue and red lamps.

Green lamps 16a', 16b', 16c', 16d' and 16e' are connected to the line 19 through the switch 15 and the sensor 8, and amber lamps 16a", 16b", 16c", 16d" and 16e" are connected to the line 20 through the sensor 8 and through a switch 21 and a resistor 22. When one or more green lamps are energized the switch 21 is turned off whereby amber lamps are dimmed by the resistor 22. The switch 21 is shown as an electromagnetic type but any suitable relay switch may be utilized. When any of the green lamps is not energized the switch 21 is turned on so that the intensity of amber lamps will be increased.

The sensor 8 shown in the illustrated embodiment comprises contact portions 9a – 9e and 10a – 10e, and contacts 11 comprising contact 11' of line 19 and contact 11" of line 20 cooperating respectively with contact portions 9a – 9e and 10a – 10e. The contacts 11 move in the directions of arrow X in FIG. 3 relative to the contact portions 9a – 9e and 10a – 10e in response to the accelerator pedal being depressed or the throttle valve being actuated. In FIG. 3, the contacts 11 assume the position of the solid lines at zero opening of the throttle valve or in the non-actuated position of the accelerator pedal, and assume the broken lines position at the full open position of the throttle valve or the fully depressed position of the accelerator pedal. The contact portions 9a – 9e are connected respectively to green lights 16a' – 16e', and the contact portions 10a – 10e to amber lights 16a" – 16e" respectively. Rectifiers 12 are disposed in these connections as shown, so that when the contacts 11 cooperate with the contact portions 9a and 10b the green light 16a' and amber lights 16b" – 16e" are illuminated, and when the contacts 11 cooperate with the contact portions 9b and 10c the green lights 16a' and 16b' as well as amber lights 16c", 16d" and 16e" are illuminated. In FIG. 3, only the contact portion 10a contacts the contact 11' at the zero opening position of the throttle valve, and a portion of contact portion 9 opposite to the contact portion 10a is provided with a spacer S.

With the aforesaid arrangement, when the switch 15 is in its on position, i.e., when the intake pressure is over a predetermined value, the relative position of depression of the accelerator pedal is numerically indicated by the number of green lights which are lit so that the drivers of trailing cars may have an indication of the speed of the vehicle. In this respect, amber lights in another partition in which the green lights are not lit are lit with reduced intensity, thereby fascilitating the recognition of the number of the green lights which are lit.

In an engine braking condition, the intake pressure is lowered below the predetermined level and the switch 15 is turned off. Thus the green light line 19 is deenergized to extinguish the green lights. In this respect, for instance, when the accelerator pedal 7 is released from the fully depressed position, five amber lights will be lit at increased intensity, thus drivers of trailing cars will be notified that a severe engine braking condition has been applied, and it is possible to take suitable braking action sooner than previously possible. Thus, rear-end collisions may be prevented, and safe and comfortable driving may be assured.

Figure 5:
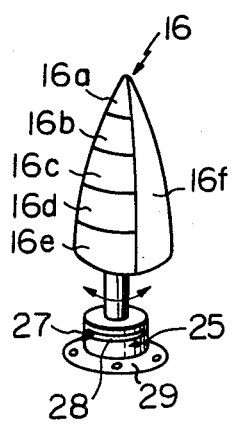
FIG. 5 is a perspective view of the warning lamp assembly according to the present invention.

Further, according to the present invention, the lamp assemblies 16a – 16e are arranged on one side surface of a lamp assembly 16 which is rotatably mounted on the vehicle as shown in FIG. 5. One or more red lamps 16f are mounted on another surface of the lamp assembly 16, and when the brake pedal or hand brake lever is actuated green and amber lamps 16a to 16e are distinguished and the lamp assembly 16 is rotated by rotating mechanism 25 to show red lamps 16f rearwardly of the vehicle which are lit at that time. Thus, drivers of the trailing cars will have a very strong impression of brake application.

The rotating mechanism may be formed of any type of publicly known mechanism for rotating the lamp assembly 16 selectively between two predetermined angular positions. For example, the mechanism 25 may be formed such that green and amber lights are directed rearwardly of the vehicle by a spring in normal condition and red lamps 16f are directed rearwardly of the vehicle by an electromagnet (not shown) which is connected parallel to the brake lights 26 and red lamps 16f. Shown at 27 is a stopper movable in an elongated groove 28 to limit rotational movement of the mechanism 25 relative to housing 29.

I claim:
1. A vehicle light assembly for indicating operating conditions of the vehicle to drivers of trailing vehicles, said assembly comprising:
a lamp housing rotatably mounted on the vehicle so as to selectively take either one of two angular positions, at least three green lamps and an amber lamp mounted on the lamp housing on another side thereof, means for urging normally the lamp housing to a first angular position wherein said one side of the lamp housing is directed rearwardly of the vehicle, means for rotating the lamp housing to a second angular position wherein said red lamp only may be visible by drivers of trailing vehicles, an electric source, a red lamp circuit operatively associated with a braking system of the vehicle for connecting the red lamp and said rotating means with the electric source when the braking system is applied, a green and amber lamp circuit connected to the electric source only when the red lamp circuit is deenergized and including a variable position switch operatively associated with the accelerator pedal of the vehicle to light a selected number of green lamps as a function of the position of the accelerator pedal, a pressure switch operatively associated with a sensor detecting intake pressure of the engine of the vehicle to extinguish the green lamps upon the decrease of the intake pressure below a predetermined level indicative of engine braking, a relay electrically coupled to said green lamps and operative to close a relay switch connected to the amber lamp when all of the green lamps are extinguished.

2. A vehicle light assembly for indicating operating conditions of the vehicle to drivers of trailing vehicles, said assembly comprising:
a lamp including at least three green lights and at least three amber lights;
first switch means responsive to the relative position of the accelerator pedal of the vehicle, said first switch means comprising first and second contacts, a plurality equal to the number of green lights of first contact portions one each electrically connected to a respective one of the green lights, and a plurality equal to the number of amber lights of second contact portions one each electrically connected to a respective one of the amber lights, said first and second contacts being movable between and relative to said first and second contact portions as a function of the position of the accelerator pedal of the vehicle, with said first contact electrically contacting a respective one of said first contact portions and said second contact electrically contacting a respective one of said second contact portions;
first circuit means for electrically connecting said first contact to an electrical power source of the vehicle and for thereby lighting selected of said green lights as a function of the position of the first contact with respect to said first contact portions, thereby giving a visual indication of the position of the accelerator pedal;
second switch means electrically coupled to said first circuit means and responsive to the intake pressure of the engine of the vehicle, for electrically opening said first circuit means upon the decrease of the intake pressure below a predetermined level indicative of engine braking for thereby extinguishing all of the green lights;
second circuit means for electrically connecting the second contact to the electrical power source of the vehicle and for thereby lighting selected of amber color lights as a function of the position of said second contact with respect to said second contact portions;

a relay electrically coupled to said first circuit means and responsive to opening or closing thereof by said second switch means;

said second circuit means including relay switch means responsive to and operable by said relay for opening said second circuit means when said first circuit means is closed and for closing said second circuit means when said first circuit means is open;

dimming resistor means, electrically coupled to said second circuit means in parallel with said relay switch means, for electrically coupling said second contact with the vehicle electrical power source when said second circuit means is opened and for lighting said selected amber lights at a dimmed intensity;

a lamp assembly mounted on the rear portion of the vehicle and having said lamp having said green and amber lights on one side surface thereof and at least one red lamp on another side surface thereof, said lamp assembly being normally urged to a first angular position in which said green and amber lights can be observed by drivers of trailing vehicles and being rotatable to a second angular position in which said the other surface is directed rearwardly of the vehicle so that the red lamp can be observed by the drivers of the trailing vehicles; and third switch means responsive to the actuation of the braking system of the vehicle for electrically opening said first and second circuit means when the braking system is actuated and electrically connecting the electrical power source of the vehicle to the red lamp and a rotating mechanism for rotating the lamp assemblies to said second angular position.

* * * * *